(12) United States Patent
De Wasch (10) Patent No.: US 10,541,986 B2
(45) Date of Patent: Jan. 21, 2020

(54) METHOD AND APPARATUS FOR SECURING AN APPLICATION USING A MEASUREMENT OF A LOCATION DEPENDENT PHYSICAL PROPERTY OF THE ENVIRONMENT

(71) Applicant: Tom De Wasch, Gentbrugge (BE)

(72) Inventor: Tom De Wasch, Gentbrugge (BE)

(73) Assignee: OneSpan North America Inc., Chicago, IL (US)

(*) Notice: Subject to any disclaimer, the term of this patent is extended or adjusted under 35 U.S.C. 154(b) by 0 days.

(21) Appl. No.: 14/985,955

(22) Filed: Dec. 31, 2015

(65) Prior Publication Data

US 2016/0191473 A1 Jun. 30, 2016

Related U.S. Application Data

(60) Provisional application No. 62/098,672, filed on Dec. 31, 2014.

(51) Int. Cl.
*H04L 29/06* (2006.01)
*H04L 9/32* (2006.01)

(52) U.S. Cl.
CPC ........ *H04L 63/0492* (2013.01); *H04L 9/3247* (2013.01); *H04L 63/061* (2013.01)

(58) Field of Classification Search
CPC .................................................. H04L 63/0492
USPC ....................................................... 713/171
See application file for complete search history.

(56) References Cited

U.S. PATENT DOCUMENTS

| | | | | |
|---|---|---|---|---|
| 6,678,612 B1* | 1/2004 | Khawam | ............... | G08B 25/016 340/426.15 |
| 7,502,933 B2* | 3/2009 | Jakobsson | ............ | G06Q 20/341 713/172 |
| 8,892,403 B1* | 11/2014 | Le Grand | ............... | G01D 9/005 702/187 |
| 9,418,358 B2* | 8/2016 | Johnson | ............ | G06Q 20/1085 |
| 9,425,978 B2* | 8/2016 | Frei | ..................... | H04L 29/1249 |
| 9,489,671 B2* | 11/2016 | Zhou | .................. | G06Q 20/3274 |
| 9,595,180 B2* | 3/2017 | White | ................... | A61B 5/1118 |
| 9,733,348 B2* | 8/2017 | Gazit | ..................... | G01S 13/02 |

(Continued)

FOREIGN PATENT DOCUMENTS

WO 2004051585 A2 6/2004

OTHER PUBLICATIONS

Lysa Myers "What is Multi-Factor Authentication, and How Will It Change in the Future? The Imperfect Present Situation", Aug. 17, 2012 (Aug. 17, 2012), XP055252436 URL:https://www.intego.com/mac-security-blog/what-is-multi-factorauthentication-and-how-will-it-change-in-the-future/ [retrieved on Feb. 23, 2016].*

*Primary Examiner* — Khalil Naghdali
(74) *Attorney, Agent, or Firm* — O'Rourke Law Office, LLC (57) ABSTRACT

Methods, apparatus, and systems for authenticating a user taking into account measurement values of characteristics of the purported environment of the user are described. Specifically, in a preferred embodiment, a device is used that comprises a sensor for making said measurement of the location dependent physical property; a memory component for storing a secret value; and a data processing component for generating an electronic signature over said measurement by cryptographically combining said measurement with a secret key comprised in or derived from said secret value.

26 Claims, 3 Drawing Sheets

(56) References Cited

U.S. PATENT DOCUMENTS

| | | | |
|---|---|---|---|
| 9,734,623 B2* | 8/2017 | Johnston | G06T 15/205 |
| 9,972,004 B1* | 5/2018 | Donavalli | G06Q 20/3224 |
| 2004/0054898 A1* | 3/2004 | Chao | H04L 63/08 |
| | | | 713/168 |
| 2008/0036591 A1* | 2/2008 | Ray | H04M 1/72569 |
| | | | 340/540 |
| 2009/0008924 A1* | 1/2009 | Ophey | G06K 19/086 |
| | | | 283/85 |
| 2009/0210712 A1* | 8/2009 | Fort | H04L 63/1441 |
| | | | 713/175 |
| 2009/0316671 A1* | 12/2009 | Rolf | H04W 4/02 |
| | | | 370/338 |
| 2012/0203663 A1* | 8/2012 | Sinclair | G06F 21/30 |
| | | | 705/26.41 |
| 2014/0089118 A1* | 3/2014 | Templeton | G06Q 20/14 |
| | | | 705/21 |
| 2014/0181256 A1* | 6/2014 | Trifa | H04L 67/2814 |
| | | | 709/218 |
| 2014/0289116 A1 | 9/2014 | Polivanyi | |
| 2015/0030157 A1* | 1/2015 | Segev | G01S 5/0027 |
| | | | 380/270 |
| 2015/0204670 A1* | 7/2015 | Morrison | G01C 21/00 |
| | | | 701/410 |
| 2017/0289762 A1* | 10/2017 | Cudalbu | H04W 4/023 |

* cited by examiner

METHOD AND APPARATUS FOR SECURING AN APPLICATION USING A MEASUREMENT OF A LOCATION DEPENDENT PHYSICAL PROPERTY OF THE ENVIRONMENT

The invention relates to securing remote access to computers and applications and remote transactions over computer networks. More specifically, the invention relates to methods and systems for authenticating a user taking into account environmental variables.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, i.e., how to authenticate users of a computer based application.

DISCLOSURE OF THE INVENTION

The invention is based on an insight of the inventors that no single method for authenticating a user remotely accessing a computer based application can give absolute certainty about the user's true identity, but that the more information is available the better the risk can be estimated that the user is not the person he or she claims to be.

The invention is further based on an insight of the inventors that one element that can be used to estimate this risk comprises the physical location from which the user is accessing the application.

The invention is based on still another insight of the inventors that the value of a number of measurable physical properties of the environment of a user can be location dependent. For some measurable physical properties of the environment there can be a more or less strong correlation between a measured value of one of these properties and the actual position (which may be expressed in three-dimensional geographical coordinates such as e.g. longitude, latitude and altitude). Principles In some embodiments this correlation may for example be used to verify the credibility of a claim with respect to a user's location. In other embodiments one or more measurements of one or more measurable physical properties of the environment that are location dependent and the value of which is correlated with the actual position may be used as a proxy for the actual position.

In some embodiments of the invention a measurement of one or more physical properties or characteristics of the (purported or actual) environment of the user may be obtained and used in assessing the reliability of the authentication of the user.

In some embodiments one or more measurement values of one or more physical properties or characteristics of the (purported) environment of the user may be used to constrain the location of the user.

In some embodiments one or more measurement values of one or more physical properties or characteristics of the purported environment of the user may be used to estimate the reliability of a determined location of the user.

In some embodiments historical measurements of one or more measurement values of one or more physical properties or characteristics of the purported environment of the user may be used in the risk analysis of an authentication of the user.

In what follows a physical quantity, property or characteristic of an environment at a certain location (such as for example the real or purported physical environment of, for example, the user) that may vary from one location to another, may be referred to as a location dependent physical property or a location dependent physical characteristic or a location dependent environmental property that may be measured at the location of, for example, the user. The terminology 'location dependent physical characteristic' and its equivalents listed above, as used herein, are not meant to encompass the location itself as may be indicated by spatial coordinates, an absolute area definition, or a geographic indication such as a town, region or country name. Also non-physical quantities or values, such as the IP (Internet Protocol) address of a computing device are not covered by the terminology 'location dependent physical property' and its equivalents listed above.

In this description the terminology 'location dependent variable' may refer to a value of a location dependent physical property, or to a value indicating a geographical location such as for example GPS coordinates, or to another value that is not a value of a location dependent physical property but that is strongly correlated with the geographical location of the device that generated that value such as the IP address of that device.

One aspect of the invention provides a method for securing the interaction between a user and a computer based application.

In some embodiments the method may comprise the steps of obtaining a measurement value of a location dependent physical property of a location from which the computer based application is (purportedly) being accessed by the user, using this measurement value in a risk analysis, and deciding on the basis of the outcome of this risk analysis whether or not to perform a certain action. In some embodiments this action may comprise for example granting the user access to an application resource or performing a transaction requested by the user.

In some embodiments the method may further comprise the step of obtaining an electronic signature over said measurement value and verifying said measurement value.

In some embodiments the method may comprise any method of any of the previous embodiments wherein the electronic signature has been generated by an authentication device (such as any of the authentication devices described elsewhere in this description) by cryptographically combining the measurement value with a first secret key comprised in or derived from a second secret stored in the authentication device. In some embodiments said second secret may be associated with said user.

In some embodiments the method may comprise any method of any of the previous embodiments wherein cryptographically combining the measurement value with the first secret key also uses the value of a dynamic variable.

In some embodiments the method may comprise any method of any of the previous embodiments further comprising the step of obtaining a location indication indicating said location from which the computer based application is (purportedly) being accessed by the user, wherein said risk analysis also uses said obtained location indication. In some embodiments the risk analysis may further use the obtained location indication in relation to the obtained measurement value of the location dependent physical property of the location from which the computer based application is (purportedly) being accessed by the user.

Another aspect of the invention provides an apparatus for providing a reliable measurement of a location dependent physical property. In some embodiments the apparatus may be used with any of the method embodiments described above.

In some embodiments the apparatus may comprise a sensor for making a measurement of a location dependent physical property, a memory component for storing a secret value, and a data processing component for generating an electronic signature over said measurement by cryptographically combining said measurement with a secret key comprised in or derived from said secret value.

In some embodiments said cryptographically combining also uses the value of a dynamic variable.

In some embodiments the apparatus may further comprise a clock for providing a time value and said dynamic variable may be based on said time value.

In some embodiments the apparatus may comprise any of the apparatus of any of the embodiments described above wherein the secret value may be associated with a specific user.

Examples of Location Dependent Environmental Characteristics

Apparent Gravity

The apparent gravity, i.e., the acceleration experienced by a body that does not move in a frame of reference that is co-moving with the earth, is location dependent. The value of the apparent gravity is roughly equal to the Standard Gravity, but it may vary from one location to another by as much as 0.7%. The apparent Gravity varies mainly as a function of latitude and altitude. Other factors that may cause the apparent gravity to differ are local or regional variations in mass distribution and densities of earth rock. The apparent gravity changes only gradually as a function of latitude and longitude. The apparent gravity is largely independent of time. The influence of human activities on the local apparent gravity can be considered negligible. Given the exact 3-dimensional position of the user's location (longitude, latitude and altitude), it is in principle possible to accurately determine the expected value of the local apparent gravity. Historical measurements for a given location, that may further be unknown, have a very high predictive value for future measurements for the same location.

Atmospheric Pressure

The pressure of the air varies from one location to another as a function of meteorological conditions and altitude. Since meteorological conditions vary strongly with time in many locations of the world and also vary strongly from one place to another, the atmospheric pressure is strongly dependent on both time and place. The atmospheric pressure usually varies smoothly and gradually as a function of latitude and longitude. The influence of human activities on the local atmospheric pressure is usually not significant and can usually be ignored. Given the meteorological conditions for a given location and time and the height of the location, it is in principle possible to accurately determine the expected value of the atmospheric pressure for a given time and location. For a given location the height of which is unknown but the latitude and longitude are approximatively known, the measurements will tend to give an offset with respect to an expected value for a standard height based on meteorological data and predictions.

Background Radiation

There are many sources, both natural and artificial, of background radiation. These include cosmic radiation and terrestrial sources (e.g., radon emanating construction materials, contaminated areas, etc.). In general the background radiation varies very significantly as a function of place even on very small spatial scales (such as from one room in a house to another for example as a consequence of different aeration). Some sources may vary considerably as a function of time (e.g., due to fluctuations in solar activity). Human activity may have a significant influence on the background radiation, even on short time scales. Even if the exact location is given with very high precision, it may often not be practically feasible to obtain reliable expected or predicted values for the measured background radiation of that location. However, for a given location the values of measurements taken at different times may be strongly correlated in many cases.

Ambient Light—Intensity & Spectral Composition

The incident light that may be measured in any given location may come from a combination of both natural and artificial sources. The measured light intensity may in general vary very significantly and unpredictably both in time and in place and on very small scales. Since users tend to access computer based applications very often from in-house locations, the ambient light is often dominated by artificial light sources such that the lighting conditions might be entirely different even for locations that are very close to each other. However, in many locations the artificial light sources themselves do not tend to change often in time. While the intensity of the incident light coming from these relatively stable artificial light sources may depend very significantly on the exact position on a very small scale with respect to these sources, other aspects such as for example some properties of the spectrum (e.g., specific strong emission lines for certain types of lighting such as may be the case for fluorescent light bulbs) may be relatively independent of the exact location of the measurement device with respect to the light source and therefore measurements of these aspects may be relatively constant in time and place for a given room where the lighting is dominated by that light source. To the extent that a user tends to access a remote application from the same room, a measurement of these properties can provide a confirmation that the user indeed is operating from the usual location.

Chemical Composition of the Air

The exact chemical composition of the air is usually location dependent whereby the presence or concentration of certain trace gases may be characteristic of certain locations. This may be due to, for example, local sources of pollution, types of vegetation, soil types, etc.

Using Location as an Element in a Risk Analysis

In some embodiments the location of a user may be an element in a risk analysis to decide for example whether or not to grant the user a certain authorization. Such a risk analysis may for example by done by an authentication server. For example, in some embodiments certain locations may be deemed more or less risky than others. For example a location in the home town of the user may be deemed less risky than a location in some foreign country where the user is not known to have ever been before. In some embodiments an autonomous risk factor may be associated with at least certain locations. For example certain geographic locations (certain countries, cities, etc.) may be deemed to be more correlated with fraudulent transactions than other locations. In some embodiments attention may be given to patterns in the various locations from which a user accesses or has accessed an application before and to the relation between a current location from which the user accesses the application and the locations from which the user is known to have accessed the application before, whereby unusual or unexpected locations may be deemed to be more risky than locations that are consistent with the normal behavior of the user or that are consistent with an expected location of the user in view of other information. For example, in some embodiments a user accessing the application from a location from which the user recently has been frequently accessing the application may be deemed to be less risky than the same user accessing the application from a location from which that user has never accessed the application before. Alternatively, in some embodiments an application may have information indicating that a user is on holiday in a foreign country and in view of that a transaction whereby the user apparently is accessing the application from his or her home town may be deemed to have a heightened risk of fraud, even if the user very frequently accesses the application from that home town location.

Using Location Dependent Physical Characteristics for Authentication

In some embodiments one or more location dependent physical characteristics may be obtained and used for authentication purposes. For example, in some embodiments one or more location dependent physical characteristics may be used in conjunction with a location indication of the user that may be obtained independently of the one or more location dependent physical characteristics. In other embodiments one or more location dependent physical characteristics may be used as autonomous proxies for the location of the user.

Using a Location Dependent Physical Characteristic in Conjunction with a Location Indication In some embodiments of the invention an indication of the location of the user may be obtained. For example in some embodiments an indication of the user's location may be obtained on the basis of the IP address of the user. The obtained location indication may then, for example, be used in a risk analysis as is described in more detail elsewhere in this description. This risk analysis may for example be done by an authentication server. In some embodiments this obtained location indication may not be deemed beyond any doubt or uncertainty. For example location indications that are obtained on the basis of the user's IP address may not always be correct or reliable. In some embodiments a measurement of a location dependent physical property may be obtained, such as, for example, a measurement of the local apparent gravity or the local atmospheric pressure. In some embodiments the obtained value of this measurement of the location dependent physical property may be cross-referenced, for example by an authentication server, with the obtained location indication, for example, to estimate a level of confidence in the obtained location indication.

For example, in some embodiments the obtained location indication may be used, for example by an authentication server, to determine an expected value for the location dependent physical property and this expected value may be compared with the obtained value for the measurement of the location dependent physical property. In some embodiments the degree that the expected value and the obtained value for the measurement match may be used in a subsequent risk analysis, for example, to determine the level of confidence for the obtained location indication. In some embodiments the obtained location indication may be used, for example by an authentication server, to calculate a probability function for all possible values of a measurement of the location dependent physical property. The probability indicated by this function for the effectively obtained measurement may then be used in the risk analysis. In some embodiments the obtained measurement of the location dependent physical property may be used, for example by an authentication server, to calculate a probability function for all possible values of the location. In some embodiments the probability indicated by this calculated probability function for the effectively obtained indication of the location may then be used in the risk analysis. In some embodiments the obtained location indication and the obtained measurement of the location dependent physical property may be used, for example by an authentication server, in a Bayesian analysis to determine a probability function for the actual location of the user. This probability function may then be used in the risk analysis.

In some embodiments the weight that is given to the obtained location indication in the risk analysis may be a function of the degree that the location indicated by the obtained location indication and the obtained measurement of the location dependent physical property match each other. For example, in some embodiments if the obtained measurement of the location dependent physical property is inconsistent with the location indicated by the obtained location indication, then a low weight may be given to the location of the user as a factor that may confirm the authenticity of the user. For example, if the obtained location indication indicates a user location that is fully in-line with the usual behavior of the user, then this may be given nevertheless little weight in the risk analysis if this obtained location indication is not supported by a matching measurement of the location dependent physical property.

In some embodiments the degree of inconsistency between the obtained location indication and the obtained measurement of the location dependent physical property may itself be treated in the risk analysis as a risk indicating factor. For example, if there is a rather significant inconsistency between the obtained location indication and the obtained measurement of the location dependent physical property, then this could be a sign that either the location indication or the measurement of the location dependent physical property (or both) have been manipulated or have been interfered with, for example, in an attempt to mislead other criteria (such as location dependent criteria) of the risk analysis.

Using a Location Dependent Physical Characteristic as an Autonomous Proxy for the Location of the User In some embodiments it may not be feasible or practical to obtain a real location indication indicating the actual location of the user accessing the application at a given moment. In some embodiments an obtained measurement of the location dependent physical property may be used to help determine a probable location of the user and that determined probable location may then be used in the risk analysis. For example, in some embodiments an actual location for the user may be hypothesized (e.g., the home address of the user) and the obtained measurement of the location dependent physical property may be used to test this hypothesis or to determine a probability that this hypothesis is correct and this determined probability of the given hypothesis may be used in the further risk analysis. In some embodiments each location of a set of possible locations for the actual location of the user may be given a prior probability and for each of these possible locations the probability that this location may give the obtained measurement of the location dependent physical property may be calculated. A Bayesian analysis may then be used to calculate the posterior probabilities for each of the locations of the set that the actual location of the user coincides with the given location of the set. These posterior probabilities may then be used in the further risk analysis.

In some embodiments an attempt to determine or guess an actual location of the user may be omitted altogether. Rather, in some embodiments the risk analysis may be done directly using the obtained measurement of the location dependent physical property. For example, in some embodiments a behavioral analysis may be done directly on the pattern of historical obtained measurements of the location dependent physical property of a given user. For example, if a risk analysis takes into account whether a user is accessing the application from a location that is typical for the user or rather from a location that is unusual for the given user, then the determining the actual location may not be necessary or even helpful. It may indeed suffice to just recognize unusual deviations or variations in the location of the user. Because of the correlation between the actual location of a user and the obtained value of a location dependent physical property, similar information may also be obtained by looking for unusual deviations or variations in the pattern of obtained values of the location dependent physical property. For example, a change in the obtained value of the apparent gravity may signify that the application is not being accessed anymore at the location from which the user is usually accessing the application, but is likely being accessed from a completely different location.

Obtaining the Measurement of the Location Dependent Physical Property.

In some embodiments the location dependent physical property may be measured with a device that may be adapted to be secure and trustable so that it may be resistant against tampering with the value once the device has measured it. For example, in some embodiments a dedicated authentication device may comprise a sensor for measuring the location dependent physical property. For example, the authentication device may comprise an acceleration sensor for measuring the apparent gravity or a pressure sensor for measuring the atmospheric pressure.

In some cases the chosen technique for measuring a value of a particular location dependent physical property may be prone to contamination or errors induced by other physical phenomena. Such errors induced by other physical phenomena than the actual physical property one would like to measure may even dwarf by orders of magnitude the sometimes relatively small variances or differences in the value of the physical property. For example, in some embodiments an acceleration sensor may be used to measure the local strength of gravity. However an acceleration sensor may not be capable of sensing the difference between an apparent acceleration due to gravity and an acceleration due to a (change in) movement of the device comprising the acceleration sensor. Such a movement causing accelerations with an amplitude that may be similar or even far larger than amplitude differences that may be due to differences in location, could be due to, for example, the movements caused by the user using and manipulating the device or the user traveling and taking the device with him/her which in many cases would cause the device to be submitted to vibrations. However, both the amplitude and the direction of the accelerations induced by such movements of the device would typically vary rapidly in time, whereas the local strength of gravity remains constant as long as the device remains in the same location. In some embodiments, rather than taking into account only a single measurement of the current value, a time series of measurements may be taken into account. For example in some embodiments measurements may be made continuously or at regular intervals (for example every 5 seconds). When the device is at rest with respect to the earth, then the value measured by an acceleration sensor comprised in the device should be constant and should correspond to the local strength of gravity. In some embodiments the acceleration measured in such a period of apparent rest may be used as the measurement of the local strength of gravity. In some embodiments the value of the local strength of gravity may be determined as the acceleration measured during the last period of apparent rest. In some embodiments a time series of acceleration measurements may be used to identify such rest periods wherein the measurements by the acceleration sensor of the device's acceleration remain sufficiently constant. In some embodiments a rest period is defined as a time period of a length that exceeds a certain predefined minimal length (e.g. one minute) wherein the mutual differences of all measured values of the acceleration does not exceed a certain predefined threshold (e.g., 0.01 m/s$^2$). In some embodiments such a series of measurements may be subjected to a low pass filter and the output of the low pass filter may be used. Since accelerations associated with moving the device will in most cases average out, applying a low-pass filter may allow obtaining a useful measurement of the local gravity even if the device is subject to vibrations, for example when the device is being used in a train. For example in some embodiments a value for the local strength of gravity may be determined as the average value of a series of recent acceleration measurements that have been obtained within a certain period of time from the current time. For example in some embodiments a value for the local strength of gravity may be determined as the average value of the acceleration measurements made in the last 20 minutes. In some embodiments using a series of past measurements to determine a value for the local strength of gravity may comprise removing outliers. Removing outliers may for example happen prior to subjecting the series to a low-pass filter or to using the series to determine a period of rest. For example in some embodiments all measurements that fall outside a certain range may be discarded, or a pre-defined fraction (for example 10%) of the measurements having the highest and/or lowest values may be discarded.

Cryptographically combining the obtained measurement of a location dependent physical property or the location dependent variable with a cryptographic secret key.

The authentication device may also be adapted to cryptographically protect the integrity of the obtained value of a location dependent physical property or of a location dependent variable. For example, the authentication device may be adapted to generate an electronic signature over the obtained value for the measurement of a location dependent physical property provided by a sensor of the authentication device.

In some embodiments the authentication device may also include a dynamic variable (such as for example a time value provided by a clock that may also be comprised in the authentication device) in the generation of the signature, for example to prevent replay attacks.

In some embodiments the authentication device may generate the electronic signature using a secret cryptographic key the value of which may be specific for each individual authentication device. For example, in some embodiments each individual authentication device may be personalized with its own different secret signature key. In some embodiments the authentication device may be adapted to generate the electronic signature over the measurement of a location dependent physical property by cryptographically combining the personalized secret signature key with the measurement of a location dependent physical property and (optionally) the value of a dynamic variable. In some embodiments the personalized secret signature key may comprise a symmetric cryptographic key that the authentication device may share with a signature verification entity and the authentication device may be adapted to generate the electronic signature using a symmetric cryptographic algorithm that may be parameterized with the secret signature key. In some embodiments the symmetric cryptographic algorithm may, for example, comprise a symmetric encryption or decryption algorithm, such as for example AES (Advanced Encryption Algorithm), or a MAC (Message Authentication Code) algorithm or a one-way keyed hashing algorithm such as for example HMAC (Hash-based message authentication code). In some embodiments the personalized secret signature key may comprise a private key of an asymmetric cryptographic public/private key pair and the authentication device may be adapted to generate the electronic signature using an asymmetric cryptographic electronic signature algorithm that may be parameterized with the personalized secret signature key. In some embodiments the private key may be certified by a trusted certificate authority. In some embodiments the asymmetric cryptographic electronic signature algorithm may comprise for example the RSA (Rivest-Shamir-Adleman) algorithm.

In some embodiments the personalized secret signature key may be associated with a particular user and the generated signature may be used as a dynamic credential to authenticate the user.

In some embodiments the dynamic variable may be a function of a time value (that may, for example, be provided by a clock comprised in the authentication device). In some embodiments the dynamic variable may be a function of the value of an event related variable. In this description, the terminology "event related variable" may refer to a variable the value of which may be automatically updated using an update algorithm upon the occurrence of a specific event. In some embodiments the specific event may for example comprise the usage by the authentication device of the event related variable to generate an electronic signature or dynamic credential. In some embodiments the event related variable may comprise a counter and the update algorithm may comprise the monotonic incrementing (or decrementing) of the counter. In some embodiments the update algorithm may comprise, for example, a one-way hashing algorithm and the event related variable may be updated with a new value that is obtained as the result of applying the one-way hashing algorithm to an old value (e.g., the current value before the update) of the event related variable. In some embodiments the event related variable may comprise the secret signature key. For example, in some embodiments the value of the secret signature key may be updated with a new value, that may be a function of a previous value of the secret signature key, each time the secret signature key is used to generate an electronic signature or dynamic credential. In some embodiments the dynamic variable may be based on a challenge that may, for example, be generated by a server and that may, for example, be provided to the authentication device (e.g., by the user entering the challenge using a user input interface of the authentication device). In some embodiments the dynamic variable may be based on transaction data that may be provided to the authentication device (e.g., by the user entering the transaction data using a user input interface of the authentication device).

For example, in some embodiments the authentication device may comprise a smart card. The smart card may comprise a pressure sensor for measuring the atmospheric pressure. The smart card may be adapted to securely store a secret signature key, to receive transaction data, to obtain a measurement of the atmospheric pressure using its pressure sensor and to generate an electronic signature over a combination of the obtained measurement of the atmospheric pressure and the received transaction data using a cryptographic electronic signature algorithm that may be parameterized with the stored secret signature key.

In some embodiments the measurement of the location dependent physical property may be obtained using a personal computing device of the user that may comprise a sensor that may be suitable for or adapted to obtaining a measurement of a location dependent physical property. In some embodiments a computer based application may be given access to a measurement obtained with that sensor and the computer based application may use this measurement in a risk analysis for authenticating the user of the personal computing device.

For example, in some embodiments the personal computing device may comprise a smartphone. In some embodiments the personal computing device may comprise a sensor for measuring accelerations of the personal computing device and the sensor may be used to measure the apparent gravity, for example, when the device is at rest with respect to the earth.

In some embodiments the user may use a general purpose computing device to access a computer based application. The application may obtain from the general purpose computing device a location indication which may be relatively precise. For example, in some embodiments the application may obtain the IP address of the access device and may use the IP address of the access device to estimate the location of the access device, e.g. using IP geolocation methods. Or the access device may, for example, comprise a smartphone comprising a GPS (Global Positioning System) module. However, the general purpose computing device may not be a highly secure platform so that the location indication obtained from the access device may not be highly reliable. In some embodiments the user may have a secure trusted authentication device adapted to obtain a measurement of a location dependent physical property and to generate an electronic signature over this measurement to cryptographically protect the integrity of this measurement. The application may in addition to obtaining the location indication of the access device also obtain from the user's authentication device the measured value of the location dependent physical property and the signature over this measured value. The application may verify the signature over the measured value of the location dependent physical property. The application may then use the obtained location indication and the obtained measurement of the location dependent physical property in a risk analysis for authenticating the user. As the obtained location indication may be more precise and specific with respect to the actual location from which the application is being accessed and the measurement of the location dependent physical property may be more reliable because of the signature over this measurement generated by a trusted authentication device, the application may use the obtained location indication and the obtained measurement of the location dependent physical property in a complementary way. For example in some embodiments the application may attribute a higher level of reliability to the location indication if it is consistent with the obtained measurement of the location dependent physical property, and/or the application may deem the location indication as unusable if it is inconsistent with the obtained measurement of the location dependent physical property, and/or may even consider a possible inconsistency between the location indication and the measurement of the location dependent physical property as a sign that may indicate a higher risk.

Communicating the value of the location dependent physical property to an authentication server.

In some embodiments the local value of a location dependent physical property of the location from which a user is accessing a remotely accessible computer based application, may be obtained and may be used in a risk analysis as explained in more detail elsewhere in this description. In some embodiments the risk analysis may be done by a server such as an authentication server. In some embodiments doing this risk analysis may require the server doing the risk analysis in order to obtain this local value of that location dependent physical property.

In some embodiments this local value of that location dependent physical property may be determined by an access device that the user is using to remotely access the remotely accessible computer based application. In some embodiments the access device may communicate the thus determined local value of that location dependent physical property to the server doing the risk analysis. In some embodiments the access device may communicate the thus determined local value of that location dependent physical property to the server using the same communication channel that the access device uses to exchange application data with an application server hosting a server part of the remotely accessible computer based application.

In some embodiment the access device may be adapted to determine a local value of that location dependent physical property itself. For example the access device may comprise one or more sensors for measuring the location dependent physical property.

In some embodiments an authentication device that is different from the access device may be adapted to determine the local value of that location dependent physical property. For example the authentication device may comprise one or more sensors for measuring the location dependent physical property. The authentication device may be adapted to send to the access device this local value of the location dependent physical property that it has determined. The access device may be adapted to receive from the authentication device this local value of the location dependent physical property determined and sent by the authentication device. The access device may be further adapted to forward to the server this received local value of the location dependent physical property.

In some embodiments the authentication device may be further adapted to cryptographically generate a dynamic credential or electronic signature for example by cryptographically combining a cryptographic secret key with the local value of that location dependent physical property determined by the authentication device, for example according to one of the methods explained in more detail elsewhere in this description. In some embodiments the authentication device may be adapted to send this dynamic credential or electronic signature that it has thus generated to the access device, or the authentication device may be adapted to make this dynamical credential or electronic signature available for transfer to the access device, and the access device may be adapted to receive this dynamic credential or electronic signature generated by the authentication device. In some embodiments this transfer from the authentication device to the access device of the dynamic credential or electronic signature generated by the authentication device may comprise a manual transfer by the user from the authentication device to the access device of the dynamic credential or electronic signature generated by the authentication device. In some embodiments this manual transfer may comprise the authentication device communicating the generated dynamic credential or electronic signature to the user (e.g., by displaying the dynamic credential or electronic signature on a display comprised in the authentication device). In some embodiments this manual transfer may comprise the access device receiving the generated dynamic credential or electronic signature from the user (e.g., by the user entering the dynamic credential or electronic signature into the access device using a user input interface such as a keyboard or touch screen comprised in the access device).

In some embodiments the authentication device may be adapted to determine the local value of the location dependent physical property and to cryptographically generate a dynamic credential or electronic signature for example by cryptographically combining a cryptographic secret key with that determined local value, and the authentication device may be adapted to send both this determined local value of the location dependent physical property and this generated dynamic credential or electronic signature to the access device. The access device may be adapted to receive from the authentication device both this determined local value of the location dependent physical property and this generated dynamic credential or electronic signature both sent by the authentication device, and the access device may be further adapted to send or forward both this received local value of the location dependent physical property and this received dynamic credential or electronic signature (both received from the authentication device) to the server.

In some embodiments the authentication device may be adapted to determine the local value of the location dependent physical property and to cryptographically generate a dynamic credential or electronic signature for example by cryptographically combining a cryptographic secret key with that determined local value, and the authentication device may be adapted to send directly to the server either this determined local value of the location dependent physical property or this generated dynamic credential or electronic signature, or to send directly to the server both this determined local value of the location dependent physical property and this generated dynamic credential or electronic signature. For example in some embodiments the authentication device may be comprised in the access device. In some embodiments the authentication device may be a different device than the access device and the authentication device may be adapted to send data, such as this determined local value of the location dependent physical property or this generated dynamic credential or electronic signature, directly to the server using a different communication channel than the communication channel that may be used by the access device to exchange application data with an application server.

Verifying Received Dynamic Credential or Electronic Signature

In some embodiments the authentication server may be adapted to receive a dynamic credential or electronic signature that was generated, as explained in more details elsewhere in this description, by an authentication device using a value of the location dependent physical property or a location dependent variable that the authentication device may have determined, as explained in more details elsewhere in this description. In some embodiments the server may be adapted to use this received dynamic credential or electronic signature for example in a risk analysis. In some embodiments the authentication server using the received dynamic credential or electronic signature may comprise the server cryptographically verifying the received dynamic credential or electronic signature.

In some embodiments cryptographically verifying the received dynamic credential or electronic signature may comprise determining reference values for the various input data elements that were used by the authentication device in generating the dynamic credential or electronic signature, and using these reference values in a verification algorithm. For example, in some embodiments the server may be adapted to obtain one or more possible sets of reference values for these input data elements and may generate for each possible set of reference values a corresponding candidate credential reference value for the dynamic credential or electronic signature, and the server may compare the received dynamic credential or electronic signature to the generated candidate credential reference values. In some embodiments the server may successfully validate the received dynamic credential or electronic signature if the received dynamic credential or electronic signature matches one of the generated candidate credential reference values. Obtaining one or more possible sets of reference values for the input data elements that were used by the authentication device in generating the dynamic credential or electronic signature, may include obtaining one or more possible reference values for a local value of a location dependent physical property or for a location dependent variable that was used by the authentication device in generating the dynamic credential or electronic signature.

In some embodiments the server may receive from the access device or from the authentication device, as a separate data element distinct from the generated dynamic credential or electronic signature, a value for the location dependent physical property, or the location dependent variable, that has allegedly been used by the authentication device for generating the dynamic credential or electronic signature. In some embodiments, when verifying the received dynamic credential or electronic signature, the server may use this received value for the location dependent physical property, or the location dependent variable, as a reference value for the local value of a location dependent physical property, or location dependent variable, that was used by the authentication device in generating the dynamic credential or electronic signature.

In some embodiments the dynamic credential or electronic signature that the server has received from the access device or from the authentication device may comprise synchronization data that contains information about the actual local value of a location dependent physical property, or location dependent variable, that was used by the authentication device in generating the dynamic credential or electronic signature. For example, in some embodiments the actual local value of a location dependent physical property, or location dependent variable, that was used by the authentication device may be comprised entirely or partially in synchronization data included in the dynamic credential or electronic signature. For example, in some embodiments the dynamic credential or electronic signature may comprise synchronization data comprising the N least significant bits of the actual local value of a location dependent physical property, or location dependent variable, that was used by the authentication device (wherein N may be a positive integer). In some embodiments the server may be adapted to extract the synchronization data from the received dynamic credential or electronic signature and to use the information that it contains about the actual local value of a location dependent physical property, or location dependent variable, that was used by the authentication device to constrain the possible reference values for that local value of a location dependent physical property, or location dependent variable, when verifying the received credential or electronic signature. For example, in some embodiments the server may generate an initial list of candidate possible reference values and may remove any candidate value from this initial list that does not match the information contained in the synchronization data about the local value of a location dependent physical property, or location dependent variable, that was actually used by the authentication device and the server may only retain the remaining candidate values as possible reference values to be used in verifying the received dynamic credential or electronic signature. For example in some embodiments the server may retain only candidate values whose N least significant bits match the N least significant bits of the local value of a location dependent physical property, or location dependent variable, that was actually used by the authentication device as documented in the synchronization data.

In some embodiments the server may determine a list of possible reference values for the local value of a location dependent physical property, or location dependent variable, that was used by the authentication device that correspond to values of a location dependent physical property, or location dependent variable, that obey some other criterion. For example in some embodiments the server may determine the list of possible reference values for the local value of the location dependent physical property, or location dependent variable, as all the values that are possible for one or more allowed locations. For example, in some embodiments the authentication system may be adapted to only accept the user if the user is accessing the system from one or more specific allowed locations. The server may determine all the values of the local value of the location dependent physical property, or location dependent variable, that can occur at these allowed locations and use these determined values corresponding to the allowed locations as the possible reference values for the local value of the location dependent physical property, or location dependent variable. If the received dynamical credential or electronic signature can be successfully verified with this list of possible reference values for the local value of the location dependent physical property, or location dependent variable, then this may be interpreted as signaling that the authentication device (and presumably therefore also the user) was at one of the allowed locations when the dynamical credential or electronic signature was generated by the authentication device.

Conversely, in some embodiments the server may use the received dynamical credential or electronic signature to constrain the value of the location dependent physical property, or location dependent variable, that was used by the authentication device to generate the dynamical credential or electronic signature. For example in some embodiments the server may make a list of possible reference values that comprises all values that may possibly occur at all possible locations. The server may then try to verify the received dynamic credential of electronic signature with each of these possible reference values and may retain those values for which the verification was successful (depending on the algorithm that was used by the authentication device to generate the dynamic credential or electronic signature, in some embodiments there may be more than one value for which the verification is successful). In some embodiments the server may use this list of all values for the location dependent physical property, or location dependent variable, to constrain in turn the location where the authentication device has generated the dynamic credential or electronic signature, e.g. by using a known correlation between geographical location and the local value of the location dependent physical property at a given geographical location. For example in some embodiments the server may determine all locations for which the location dependent physical property, at the time of generation of the dynamic credential or electronic signature, may have had a value that is among the list of values for which the verification of the received dynamic credential or electronic signature was successful. This list or range of determined locations may be interpreted as the locations where the authentication device (and presumably therefore also the user) was when the dynamical credential or electronic signature was generated by the authentication device. In some embodiments this information about the actual possible locations of the user may be used in an overall risk analysis.

In some embodiments the access device and the authentication device may be different devices and the access device may be adapted to determine a first value (at the location of the access device) of a location dependent physical property and the authentication device may be adapted to determine, independently from the access device, a second value (at the location of the authentication device) of the same location dependent physical property. The authentication device may be further adapted to generate a dynamic credential or electronic signature using that second value, for example by cryptographically combining a cryptographic secret key with that second value determined by the authentication device as explained in more detail elsewhere in this description. The access device may be adapted to send to the server the first value of the location dependent physical property to the server. The server may be adapted to receive from the access device the first value of the location dependent physical property determined by the access device. The server may be further adapted to receive the dynamic credential or electronic signature that was generated by the authentication device using that second value of the location dependent physical property that was determined by the authentication device. The server may be adapted to receive that dynamic credential or electronic signature generated by the authentication device either directly from the authentication device, or indirectly, i.e., from the access device which may have received the dynamic credential or electronic signature from the authentication device and may have forwarded the received dynamic credential or electronic signature to the server. For example, in some embodiments the authentication device may be adapted to present the dynamic credential or electronic signature that it has generated to the user (e.g., by displaying it on a display of the authentication device), and the user may manually transfer the presented dynamic credential or electronic signature to the access device (e.g., by inputting it into a human input interface or touch screen such as a keyboard of the access device). In some embodiments the server may use the received dynamic credential or electronic signature to test the veracity or credibility of the first value of the location dependent physical property as sent to the server by the access device. For example, the server may use the received first value of the location dependent physical property to determine a set of possible reference values for the second value of the location dependent physical property that was used by the authentication device in generating the dynamic credential or electronic signature. In some embodiments the server may simply include only the first value in the set of possible reference values. In some embodiments the server may include in the set of possible reference values all possible values that match the first value within a given margin of uncertainty. In some embodiments, if the received dynamical credential or electronic signature can be successfully verified with this list of possible reference values for the second value of the location dependent physical property then this may be interpreted as a confirmation of the veracity or credibility of the first value of the location dependent physical property as received by the server from the access device, and this first value may then be used in a further risk analysis.

In some embodiments the access device may determine a first value of a location dependent variable, and the authentication device may determine, independently from the access device, a second local value for a location dependent physical property and the authentication device may generate a dynamic credential or electronic signature using that second local value for a location dependent physical property. An authentication server may receive the generated dynamic credential or electronic signature and the first value of the location dependent variable. In some embodiments the server may use the received dynamic credential or electronic signature to test the veracity or credibility of the first value of the location dependent variable as sent to the server by the access device. For example, the server may use the received first value of the location dependent variable to determine a set of possible reference values for the second value of the location dependent physical property that was used by the authentication device in generating the dynamic credential or electronic signature. In some embodiments the server may include in the set of possible reference values all possible values that match, according to some given criterion, the first value. For example in some embodiments, the server may determine a list or range of geographical locations that match the first value of the location dependent variable, and the server may determine all the possible values that the location dependent physical property may have (at the time of generation of the received dynamic credential or electronic signature) for any location in that determined list or range of geographical locations and include all these values in the set of possible reference values. For example in some embodiments the first value of the location dependent variable may comprise the GPS coordinates of the access device and the set of possible reference values for the second value of the location dependent physical property may comprise all values that the location dependent physical property may have at the location indicated by these GPS coordinates. In some embodiments, if the received dynamical credential or electronic signature can be successfully verified with this list of possible reference values for the second value of the location dependent physical property then this may be interpreted as a confirmation of the veracity or credibility of the first value of the location dependent variable as received by the server from the access device, and this first value of the location dependent variable may then be used in a further risk analysis.

In some embodiments the access device may determine a first value of a first location dependent variable, and the authentication device may determine, independently from the access device, a second value for a second location dependent variable and the authentication device may generate a dynamic credential or electronic signature using that second value for the second location dependent variable, e.g., by applying to the second value a cryptographic electronic signature algorithm parameterized with a secret key of the authentication device or by cryptographically combining the second value for the second location dependent variable with that secret key and a dynamic variable. An authentication server may receive the generated dynamic credential or electronic signature and the first value of the location dependent variable. In some embodiments the server may use the received dynamic credential or electronic signature to test the veracity or credibility of the first value of the location dependent variable as sent to the server by the access device. For example, the server may use the received first value of the location dependent variable to determine a set of possible reference values for the second value of the location dependent variable that was used by the authentication device in generating the dynamic credential or electronic signature. In some embodiments the server may include in the set of possible reference values all possible values that match, according to some given criterion, the first value. For example in some embodiments, the server may determine a list or range of geographical locations that match the first value of the location dependent variable, and the server may determine all the possible values that the second location dependent variable may have (at the presumed time of generation of the received dynamic credential or electronic signature) for any location in that determined list or range of geographical locations and include all these values in the set of possible reference values. In some embodiments, if the received dynamical credential or electronic signature can be successfully verified with any reference value of this list of possible reference values for the second value of the location dependent physical property then this may be interpreted as a confirmation of the veracity or credibility of the first value of the location dependent variable as received by the server from the access device, and this first value of the location dependent variable may then be used in a further risk analysis.

In some embodiments both the first value of the first location dependent variable and the second value for the second location dependent variable may be limited to not comprise a value for a location dependent physical property, i.e., they either comprise a value indicating a geographical location such as for example GPS coordinates, or another value that is not a value of a location dependent physical property but that is strongly correlated with the geographical location of the device that generated that value such as the IP address of that device.

In some embodiments the first value is limited to not comprise a value for a location dependent physical property (i.e., the first value comprises either a value indicating a geographical location such as for example GPS coordinates, or another value that is not a value of a location dependent physical property but that is strongly correlated with the geographical location of the device that generated that value such as the IP address of that device) and the second value is limited to comprise only a value for a geographical location indicating value. For example in some embodiments the authentication device may comprise a GPS receiver and may be adapted to use that GPS receiver to determine its location in GPS coordinates; the first value may comprise an IP address of the access device and the second value may comprise the authentication device's GPS coordinates rounded to an accuracy of, for example, about 100 kilometers. The authentication device may generate a dynamic credential or electronic signature using these rounded GPS coordinates. The authentication server may receive the IP address from the access device and may receive the dynamic credential or electronic signature generated by the authentication device. The authentication server may use the received IP address to determine, e.g., by using IP geolocation methods, a geographical area where the access device should be located. The authentication server may then determine all possible values for the second value (i.e., the rounded GPS coordinates of the authentication device) that correspond to locations in that area. The authentication server may then verify whether the received dynamic credential or electronic signature is valid for any of these determined possible values of the second value that correspond to a location in the area determined on the basis of the received IP address of the access device. If the received dynamic credential or electronic signature is valid for any of these determined possible values, then this means that there is a consistency between the presumable location of the access device as suggested by its IP address and the GPS location of the authentication device as used by the authentication device in generating the dynamic credential or electronic signature, as one would expect in a situation where a legitimate user is physically interacting with an access device (e.g., his/her smartphone or tablet computer) and in the course of this interaction generates a dynamic credential or electronic signature with his/her authentication device. If on the other hand the received dynamic credential or electronic signature cannot be verified correctly with any of the determined possible values of the second value that correspond to a location in the area determined on the basis of the received IP address of the access device, then this may indicate that there is an inconsistency between the presumable location of the access device as suggested by its IP address and the GPS location of the authentication device as used by the authentication device in generating the dynamic credential or electronic signature, i.e., the access device may likely have been in another place than the place that the authentication device was when it generated the dynamic credential or electronic signature, which in turn may suggest that, e.g., the dynamic credential or electronic signature may have been fished and that it was not the legitimate user that was interacting with the access device from which the authentication server received the IP address. Such consistency or inconsistency may be used in a subsequent risk analysis, e.g., to determine whether to authenticate a user or whether to accept a transaction submitted along with the dynamic credential or electronic signature.

In some embodiments both the first value and the second value may be limited to comprise only values for a geographical location indicating value, such as for example GPS coordinates. For example in some embodiments the authentication device may comprise a GPS receiver and may be adapted to use that GPS receiver to determine its location in GPS coordinates; the access device may also comprise a GPS receiver and may also be adapted to use its own GPS receiver to determine its own location in GPS coordinates; the first value may comprise the full-accuracy GPS coordinates of the access device as determined by the access device and the second value may comprise the authentication device's GPS coordinates rounded to an accuracy of, for example, 5 meters. The authentication device may generate a dynamic credential or electronic signature using these rounded GPS coordinates. The authentication server may receive the first value from the access device (with the GPS coordinates of the access device in full accuracy) and may receive the dynamic credential or electronic signature generated by the authentication device. The authentication server may use the received GPS coordinates to determine all possible values for the second value (i.e., the rounded GPS coordinates of the authentication device) that correspond to locations within a certain range (e.g., a circle with a radius of 20 meters around the location indicated by the GPS coordinates of the access device) that may allow for inaccuracies and other factors causing uncertainties in the correspondence between the nominal GPS coordinates of the access device and the authentication device. The authentication server may then verify whether the received dynamic credential or electronic signature is valid for any of these determined possible values of the second value (i.e., locations of the authentication device within that range around the access device). If indeed it is possible to correctly validate the received dynamic credential or electronic signature with one of these determined possible values of the second value, then this indicates (in view of the generally good reliability of GPS coordinates) a very strong consistency between the (reported) geographical location of the access device and the geographical location of the authentication device.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of aspects of the invention are discussed below. While specific implementations are discussed, it should be understood that this is done for illustration purposes only. A person skilled in the relevant art will recognize that other components and configurations may be used without departing from the spirit and scope of the described embodiments.

Figure 1:
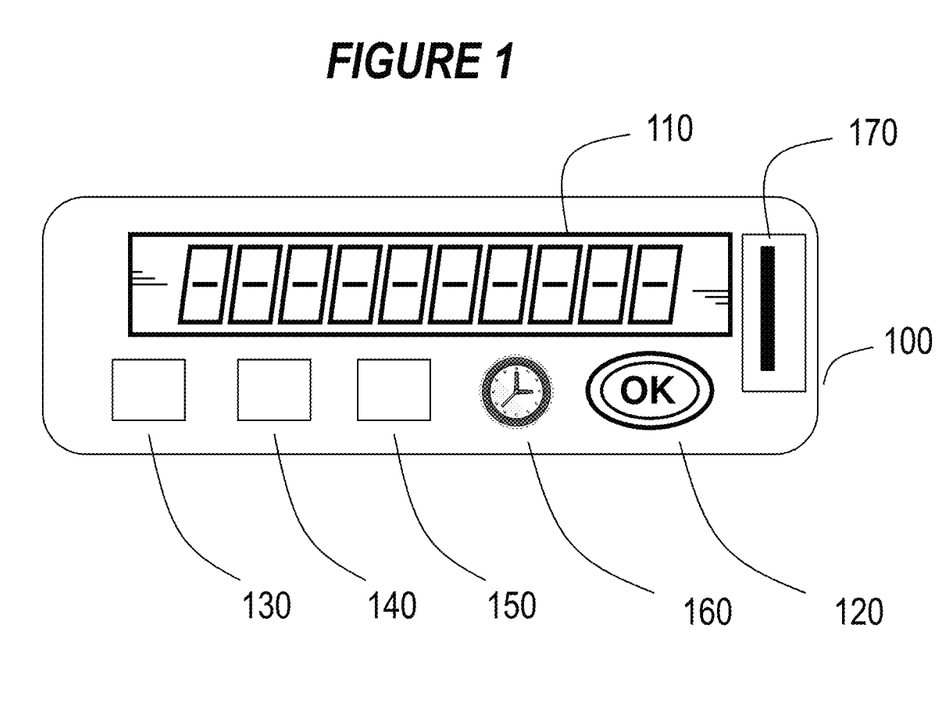
FIG. 1 schematically illustrates an exemplary apparatus according to an aspect of the invention.

FIG. 1 schematically illustrates an exemplary apparatus (100) according to an aspect of the invention. In some embodiments the apparatus may comprise an authentication device (100).

In some embodiments the authentication device may comprise a user output interface (110) and/or a user input interface (120). The user output interface may be adapted to present to the user for example messages and/or data such as for example a dynamic credential generated by the authentication device. In some embodiments the user output interface may comprise for example a display and/or loudspeakers. In some embodiments the user input interface may be adapted to receive inputs from the user such as an approval or rejection for an action (such as the generation of a dynamic credential or obtaining and cryptographically protecting a measurement of a location dependent physical property). In some embodiments the user input interface may be adapted to receive inputs from the user such as input data such as for example a PIN (Personal Identification Number), a challenge and/or transaction data, which may, for example, be used by the authentication device in the generation of a dynamic credential. In some embodiments the user input interface may comprise, for example, one or more buttons, and/or a keyboard, and/or a touch screen.

In some embodiments the authentication device may comprise a component (160) for providing a value of a dynamic variable. For example in some embodiments the component for providing a dynamic variable value may comprise a clock (160) for providing a time value.

In some embodiments the authentication device may comprise a component (170) for measuring the local value of a location dependent physical property. For example, in some embodiments the authentication device may comprise a sensor for measuring the local value of the apparent gravity. In some embodiments the authentication device may comprise a sensor for measuring the local value of the atmospheric pressure. In some embodiments the authentication device may comprise a sensor for measuring the local value of the background radiation. In some embodiments the authentication device may comprise a sensor for measuring the local value of the intensity of the ambient light. In some embodiments the authentication device may comprise a sensor for measuring the local value of certain characteristics of the spectral composition of the ambient light. In some embodiments the authentication device may comprise a sensor for measuring the local value of the chemical or isotopical composition of the air.

In some embodiments the authentication device may comprise a data processing component (130), such as for example a microprocessor, and a memory component (140) for storing data such as for example one or more cryptographic secrets or PIN reference data. In some embodiments the data processing component may be adapted to perform cryptographic calculations and/or algorithms which may be parameterized with a cryptographic key. In some embodiments, the cryptographic key may be one of the one or more cryptographic secrets stored in the memory component. In some embodiments, the cryptographic key may be derived from the one or more cryptographic secrets stored in the memory component. In some embodiments the data processing component may be adapted to cryptographically protect a measurement value of a location dependent physical property that may be made by the component (170) for measuring or determining the local value of a location dependent physical property. For example, in some embodiments the data processing component may be adapted to cryptographically combine the measurement value of the location dependent physical property with a cryptographic secret that may be one of the one or more cryptographic secrets stored in the memory component. In some embodiments the data processing component may also include a value of a dynamic variable in this combining. In some embodiments the data processing component may be adapted to generate an electronic signature over the measurement value of the location dependent physical property using a secret signature key that may be comprised in or derived from the one or more cryptographic secrets stored in the memory component. In some embodiments the authentication device may generate the electronic signature using the value of a dynamic variable (e.g., to prevent replay attacks). For example, in some embodiments the authentication device may be adapted to add a time stamp to the measurement value of the location dependent physical property and to electronically sign the time-stamped measurement value. In some embodiments the authentication device may also use a secret that is associated with a specific user in the generation of the electronic signature and the electronic signature may be used as a dynamic credential for authenticating the user.

In some embodiments the data processing component may, for example, comprise one or more microprocessors, and/or microcontrollers, and/or ASICs (Application Specific Integrated Circuits). In some embodiments the memory component may for example comprise a ROM (Read-Only Memory) and/or a RAM (Random Access Memory) component. In some embodiments the memory component may comprise flash memory. In some embodiments the memory component may comprise a hard disk.

In some embodiments the authentication device may comprise a digital interface (150) that may be adapted to connect the authentication device to a host computing device, such as a laptop or a smartphone. In some embodiments the digital interface may be adapted to exchange data between the authentication device and a connected host computing device. For example, in some embodiments the authentication device may be adapted to receive from the connected host computing device commands and/or input data (such as a challenge or transaction data) over the digital interface. In some embodiments the authentication device may be adapted to transfer to the connected host computing device responses or data such as, for example, a measurement of a location dependent physical property which may have been obtained with a location dependent physical property measuring component (170), or a dynamic credential or an electronic signature over such a measurement generated, for example, by the data processing component (130). In some embodiments the digital interface may comprise a wired interface such as, for example, a USB (Universal Serial Bus) interface and/or a wireless interface such as, for example, a Bluetooth or NFC (Near Field Connection) interface.

In some embodiments the authentication device may be portable, handheld and compact. In some embodiments the dimensions of the authentication device do not exceed 13 cm×7 cm×1 cm. In some embodiments the weight of the authentication device is no more than 100 grams.

Figure 2:
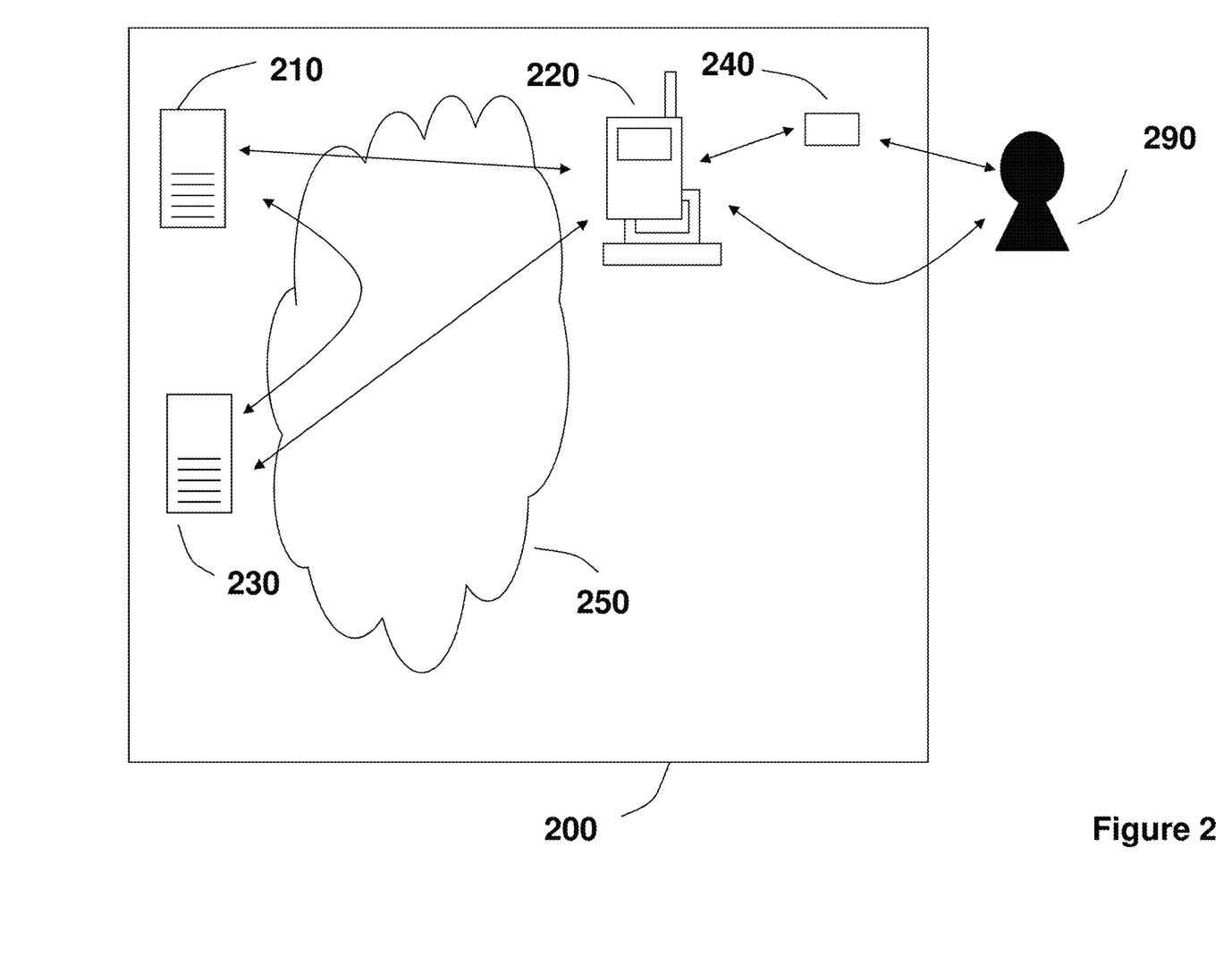
FIG. 2 schematically illustrates an exemplary system according to an aspect of the invention.

FIG. 2 schematically illustrates an exemplary system (200) of the invention according to an aspect of the invention.

In some embodiments the system may comprise an application server (210) for hosting a server part of a computer based application and one or more access devices (220) for allowing a user (290) to access and/or interact with the computer based application. In some embodiments the system may furthermore comprise an authentication server (230) for authenticating the user and/or for securing the interaction of the user with the computer based application. In some embodiments the system may furthermore comprise one or more authentication devices (240). In some embodiments the application server and/or the access devices and/or the authentication server may communicate with each other (e.g., to exchange data) over a computer network (250) which may, for example, comprise the internet. The computer network (250) may be a local area network, a wide area network, the internet and/or a combination thereof. The computer network may comprise a wireless data communication network such as for example a network for mobile telecommunication such as a mobile telephony network.

In some embodiments the application server (210) may be adapted to decide on the basis of the outcome of a risk analysis to grant or deny a request of a user, for example, to log in and/or get access to a resource controlled by the application and/or for the application to perform a certain transaction. In some embodiments the application server may be adapted to carry out this risk analysis. In some embodiments the application server may delegate this risk analysis to the authentication server. In some embodiments the application server may comprise a server computer. In some embodiments the computer based application may be web based and the application server may comprise a web server.

In some embodiments the access device(s) (220) may be adapted to allow the user (290) to access and/or to interact with the computer based application. In some embodiments the access device may comprise a user input interface (such as a keyboard) and/or a user output interface. The access device may further comprise a network interface to connect the access device to a computer network (250), for example, for communicating with the application server (210) and/or the authentication server (230). In some embodiments the access device may be adapted to generate a location indication and may be adapted to pass that location indication to the application server and/or the authentication server. For example, in some embodiments the access device may comprise a GPS module. In some embodiments the access device may be adapted to transfer to the application server and/or the authentication server a value from which a location indication may be derived such as, for example, an IP address of the access device. In some embodiments the access device may be adapted to obtain a measurement of a location dependent physical property and may be adapted to pass this measurement to the application server and/or the authentication server. In some embodiments the access device may comprise a sensor, such as, for example, an accelerometer, to make the measurement of the location dependent physical property. In some embodiments the measurement of the location dependent physical property may be made by another device, such as, for example, the authentication device (240), and the access device may be adapted to receive this measurement from the other device. In some embodiments the access device may comprise, for example, a Personal Computer (PC), a laptop, a tablet computer, or a smartphone.

In some embodiments the authentication server (230) may be adapted to carry out the risk analysis on behalf of the application server. In some embodiments the authentication server may be comprised in the application server. In some embodiments the authentication server may comprise one or more server computers. In some embodiments the authentication server (230) may comprise any of the authentication servers described elsewhere in this description.

In some embodiments the authentication device (240) may comprise any of the authentication devices described elsewhere in this description. In some embodiments the authentication device may be comprised in an access device (220). In some embodiments the authentication device may be adapted to make a measurement of a location dependent physical property and to generate an electronic signature over this measurement or to use this measurement in the generation of a dynamic credential, for example by using a cryptographic algorithm for cryptographically combining this measurement value with a cryptographic secret key and possibly also with a dynamic variable as explained in more detail elsewhere in this description. In some embodiments the authentication device may be adapted to include a dynamic variable in the generation of the electronic signature. In some embodiments the authentication device may be adapted to use a secret value that may be associated with the user in the generation of the electronic signature and the electronic signature may be used as a dynamic credential to authenticate the user.

In some embodiments the risk analysis may be performed as described elsewhere in this description. In some embodiments the risk analysis may use the value of a measurement of a location dependent physical property. In some embodiments the risk analysis may comprise verifying an electronic signature over the measurement value of the location dependent physical property. In some embodiments the risk analysis may use a location indication in relation to the measurement value of the location dependent physical property.

In some embodiments the system may be used with one of the method embodiments as described elsewhere in this description.

Figure 3:
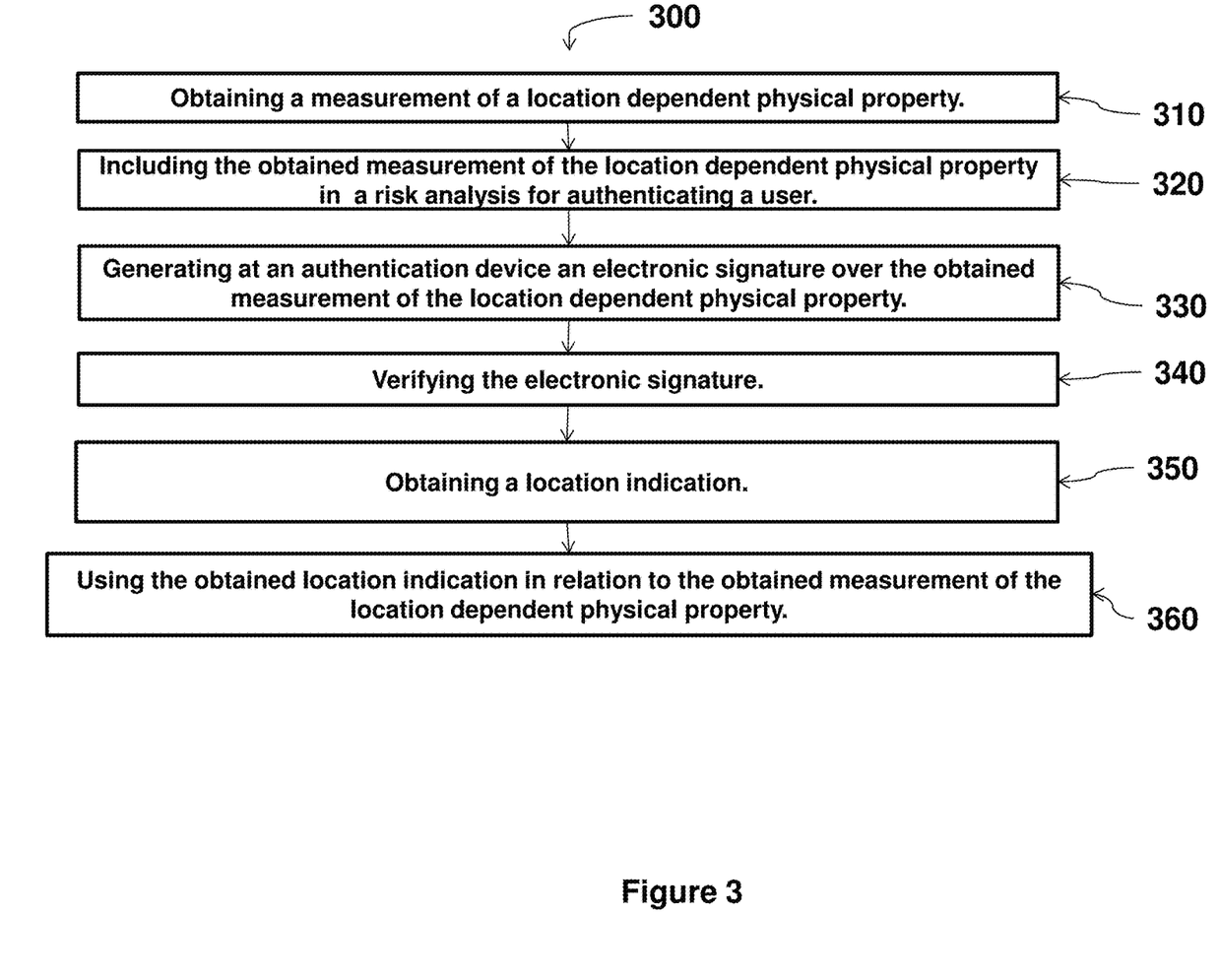
FIG. 3 schematically illustrates an exemplary method according to an aspect of the invention.

FIG. 3 schematically illustrates an exemplary method (300) according to an aspect of the invention. Variants of the method may be used with any of the apparatus or systems described elsewhere in this description.

In some embodiments the method comprises the step of obtaining (310) at the location from which a computer based application is being remotely accessed a measurement of a location dependent physical property. In some embodiments the location dependent physical property may comprise the local atmospheric pressure. In some embodiments the location dependent physical property may comprise the local apparent gravity. In some embodiments the location dependent physical property may comprise the local background radiation. In some embodiments the location dependent physical property may comprise the local intensity of incident light. In some embodiments the location dependent physical property may comprise characteristics of the spectral composition of the incident light. In some embodiments the location dependent physical property may comprise the local chemical or isotopic composition of the air.

In some embodiments the measurement of the location dependent physical property may be made by an authentication device as described elsewhere in this description. In some embodiments the measurement of the location dependent physical property may be made by a general computing device such as, for example, a personal computing device belonging to the user such as a smartphone. In some embodiments the measurement of the location dependent physical property may be made by an access device, such as, for example, a Personal Computer (PC) or a laptop or a tablet computer that the user may be using to access the computer based application.

In some embodiments the method comprises including (320) the obtained measurement of the location dependent physical property in a risk analysis for authenticating the user of the computer based application.

In some embodiments the method may comprise generating (330), for example by an authentication device, an electronic signature over the obtained measurement of the location dependent physical property and verifying this signature. In some embodiments the authentication device may comprise any of the authentication devices described elsewhere in this description.

In some embodiments the method may comprise obtaining the generated electronic signature over the obtained measurement of the location dependent physical property and verifying (340) this signature.

In some embodiments the method may comprise obtaining (350) a location indication from, for example, the access device from which the application is being accessed. In some embodiments the method may comprise using (360) the obtained location indication in relation to the obtained measurement of the location dependent physical property in the risk analysis.

In some embodiments the method may comprise the computer based application deciding on the basis of the outcome of the risk analysis whether or not to perform a certain action such as allowing the user to log in to the application, or granting the user access to a resource, or granting the user certain authorizations, or performing a certain transaction that may have been requested by the user (such as performing a money transfer).

In some embodiments some or all of the steps may be done by or at any of the authentication servers described elsewhere in this description.

In some embodiments the method may comprise any of the methods, which may include any method for generating a dynamic credential or electronic signature using a local value of a location dependent physical property and any method for verifying such generated dynamic credential or electronic signature, described elsewhere in this description.

Another aspect of the invention provides a system for securing the interaction between a user and a computer based application. In some embodiments the system may comprise an apparatus for providing an electronic signature over a first location dependent physical property, the apparatus comprising: a sensor for making a first measurement of said first location dependent physical property at a location of the apparatus, a memory component for storing a secret value; and a data processing component for generating an electronic signature over said first measurement by cryptographically combining said first measurement with a secret key comprised in or derived from said secret value. The system may further comprise an authentication server adapted to: receive a second measurement value of a second location dependent physical property of a location from which the computer based application is being accessed by the user; receive said electronic signature over said first measurement value; verify said received electronic signature; use said received second measurement value and a result of said verification of said received electronic signature in a risk analysis; and decide on the basis of the outcome of said risk analysis whether or not to perform a certain action.

More details on the obtained location indication and/or the obtained measurement of the location dependent physical property and/or the signature over the obtained measurement of the location dependent physical property and/or on using these data in the risk analysis may be found elsewhere in this description.

Yet another aspect of the invention provides a method for securing interaction between a user and a remotely accessible application.

In some embodiments the method may comprise the steps of: at an access device used by the user to access the remotely accessible application, determining a first value for a first location dependent variable; at an authentication device determining, independently from the access device, a second value for a second location dependent variable; at the authentication device generating a dynamic credential or electronic signature using said second value for the second location dependent variable and a cryptographic secret key; at an authentication server receiving the generated dynamic credential or electronic signature and the first value of the location dependent variable; and at the authentication server verifying whether the received first value of the location dependent variable is consistent with the received dynamic credential or electronic signature.

In some embodiments the step of verifying whether the received first value of the location dependent variable is consistent with the received dynamic credential or electronic signature may comprise the steps of: determining, at the authentication server, a set of possible reference values for said second value of the second location dependent variable; and verifying, at the authentication server, whether the received dynamic credential or electronic signature validates correctly with at least one reference value of said set of reference values by applying a cryptographic verification method to the received dynamic credential or electronic signature and said at least one reference value.

In some embodiments the method may further comprise the step of including, at the authentication server, in the set of possible reference values all possible values for the second location dependent variable that match, according to a given matching criterion, the first value.

In some embodiments the method may further comprise the steps of: determining, at the authentication server, a list or range of geographical locations that match the first value of the location dependent variable; and, at the authentication server, determining and including in the set of possible reference values, all possible values that the second location dependent variable can have at any location in said determined list or range of geographical locations.

In some embodiments said cryptographic secret key may comprise a symmetric cryptographic key shared between the authentication server and the authentication device; the step of generating a dynamic credential or electronic signature using said second value for the second location dependent variable and said cryptographic secret key may comprise applying to said second value a symmetric cryptographic algorithm parameterized with said cryptographic secret key; and said verifying whether the received dynamic credential or electronic signature validates correctly with at least one reference value of said set of reference values by applying a cryptographic verification algorithm to the received dynamic credential or electronic signature and said at least one reference value, may comprise calculating, at the authentication server, a reference credential value by applying to said at least one reference value said symmetric cryptographic algorithm parameterized with a server copy of said cryptographic secret key, and comparing said calculated reference credential value to said received dynamic credential or electronic signature.

In some embodiments the method may further comprise the step of performing, at the authentication server, a risk analysis taking into account the outcome of the step of verifying whether the received first value of the location dependent variable is consistent with the received dynamic credential or electronic signature.

In some embodiments the method may further comprise the step of accepting said received first value if the step of verifying whether the received first value of the location dependent variable is consistent with the received dynamic credential or electronic signature is successful.

In some embodiments said cryptographic secret key may be associated specifically with said user.

In some embodiments the first value of the first location dependent variable may comprise a first value for a first location dependent physical property at a location of the access device, and the second value of the second location dependent variable may comprise a second value for a second location dependent physical property at a location of the authentication device.

In some embodiments the first value of the first location dependent variable may comprise a first value for a location dependent physical property at a location of the access device, and the second value of the second location dependent variable may comprise a second value for the same location dependent physical property at a location of the authentication device.

In some embodiments the first location dependent variable does not comprise a location dependent physical property, and the second value of the second location dependent variable does comprise a value for a location dependent physical property at a location of the authentication device.

In some embodiments the first value of the first location dependent variable may comprise a value indicating a geographical location of the access device.

In some embodiments both the first value of the first location dependent variable and the second value for the second location dependent variable do not comprise a value for a location dependent physical property.

In some embodiments the second value for the second location dependent variable comprises a value indicating a geographical location of the authentication device.

In some embodiments the first value for the first location dependent variable is a value indicating a geographical location of the access device, and the second value for the second location dependent variable is a value indicating a geographical location of the authentication device.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application.

With respect to embodiments of the methods, while the various steps have been described in a particular order, it will be apparent for a person skilled in the art that the order of at least some of these steps may be altered. It will also be apparent for a person skilled in the art that some steps may be optional and other steps may be added. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. A method for securing interaction between a user and a computer based application, the method comprising steps of:

obtaining a measurement value of a location dependent physical property of a location from which the computer based application is being accessed by the user wherein said location dependent physical property of said location does not encompass said location itself nor an IP address and wherein the measurement value is generated by an apparatus comprising: a sensor adapted to obtain said measurement value of the location dependent physical property; a memory component adapted to store a secret value; and a data processing component adapted to generate an electronic signature over said measurement value by cryptographically combining said measurement value with a secret key comprised in or derived from said secret value;

obtaining an electronic signature over said measurement value; and verifying said electronic signature;

using the measurement value in a risk analysis to obtain an outcome; and deciding on the basis of the outcome of said risk analysis whether or not to perform a certain action.

2. The method of claim 1 in which said electronic signature has been generated by an authentication device by cryptographically combining the measurement value with a first secret key comprised in or derived from a second secret stored in the authentication device.

3. The method of claim 2 in which said cryptographically combining also uses a value of a dynamic variable.

4. The method of claim 3 wherein said second secret is associated with said user.

5. The method of claim 1 further comprising the step of obtaining a location indication indicating said location from which the computer based application is being accessed by the user, wherein said risk analysis also uses said obtained location indication.

6. The method of claim 5 wherein said risk analysis further uses said obtained location indication in relation to said obtained measurement value of the location dependent physical property of the location from which the computer based application is being accessed by the user.

7. An apparatus for use in securing interaction between a user and a computer based application comprising:
an electronic device adapted to provide a secured measurement of a location dependent physical property, the electronic device comprising:
a sensor adapted to make a measurement of the location dependent physical property, wherein said location dependent physical property of said location does not encompass said location itself nor an IP address;
a memory component adapted to store a secret value; and
a data processing component adapted to generate an electronic signature over said measurement by cryptographically combining said measurement with a secret key comprised in or derived from said secret value;
the electronic device further adapted to make said electronic signature available for verification.

8. The apparatus of claim 7 in which said cryptographically combining also uses a value of a dynamic variable.

9. The apparatus of claim 8 further comprising a clock for providing a time value wherein said dynamic variable is based on said time value.

10. The apparatus of claim 7 wherein said secret value is associated with a specific user.

11. A system for securing the interaction between a user and a computer based application comprising:
an apparatus comprising:
a sensor adapted to make a first measurement of a first location dependent physical property at a location of the apparatus;
a memory component adapted to store a secret value; and
a data processing component adapted to generate an electronic signature over said first measurement by cryptographically combining said first measurement with a secret key comprised in or derived from said secret value; and
an authentication server adapted to:
receive a second measurement value of a second location dependent physical property of a location from which the computer based application is being accessed by the user;
receive said electronic signature over said first measurement value;
verify said received electronic signature;
use said received second measurement value and a result of said verification of said received electronic signature in a risk analysis to obtain an outcome; and
decide on the basis of the outcome of said risk analysis whether or not to perform a certain action.

12. A method for securing interaction between a user and a remotely accessible application, the method comprising the steps of:
at an access device used by the user to access the remotely accessible application, determining a first value for a first location dependent variable the access device comprising a sensor adapted to determine said first value of the first location dependent variable;
at an authentication device that is physically different from the access device determining, independently from the access device, a second value for a second location dependent variable;
said authentication device comprising a sensor adapted to determine said second value for said second location dependent variable;
at the authentication device generating a dynamic credential or electronic signature using said second value for the second location dependent variable and a cryptographic secret key; said authentication device further comprising a memory component adapted to store said cryptographic secret key and a data processing component adapted to perform said generating a dynamic credential or electronic signature;
at an authentication server receiving the generated dynamic credential or electronic signature and the first value of the first location dependent variable; and
at the authentication server verifying whether the received first value of the first location dependent variable is consistent with the received dynamic credential or electronic signature.

13. The method of claim 12 wherein the step of verifying whether the received first value of the first location dependent variable is consistent with the received dynamic credential or electronic signature comprises the steps of:
determining, at the authentication server, a set of possible reference values for said second value of the second location dependent variable; and
verifying, at the authentication server, whether the received dynamic credential or electronic signature validates correctly with at least one reference value of said set of reference values by applying a cryptographic verification method to the received dynamic credential or electronic signature and said at least one reference value.

14. The method of claim 13 further comprising the step of including, at the authentication server, in the set of possible reference values all possible values for the second location dependent variable that match, according to a given matching criterion, the first value.

15. The method of claim 13 further comprising the steps of:
determining, at the authentication server, a list or range of geographical locations that match the first value of the first location dependent variable; and,
at the authentication server, determining and including in the set of possible reference values, all possible values that the second location dependent variable has at any location in said determined list or range of geographical locations.

16. The method of claim 13 wherein:
said cryptographic secret key comprises a symmetric cryptographic key shared between the authentication server and the authentication device;
the step of generating a dynamic credential or electronic signature using said second value for the second location dependent variable and said cryptographic secret key comprises applying to said second value a symmetric cryptographic algorithm parameterized with said cryptographic secret key; and wherein said verifying whether the received dynamic credential or electronic signature validates correctly with at least one reference value of said set of reference values by applying a cryptographic verification algorithm to the received dynamic credential or electronic signature and said at least one reference value, comprises calculating, at the authentication server, a reference credential value by applying to said at least one reference value said symmetric cryptographic algorithm parameterized with a server copy of said cryptographic secret key, and comparing said calculated reference credential value to said received dynamic credential or electronic signature.

17. The method of claim 12 further comprising performing at the authentication server a risk analysis taking into account the outcome of the step of verifying whether the received first value of the first location dependent variable is consistent with the received dynamic credential or electronic signature.

18. The method of claim 12 further comprising accepting said received first value if the step of verifying whether the received first value of the first location dependent variable is consistent with the received dynamic credential or electronic signature is successful.

19. The method of claim 12 wherein said cryptographic secret key is associated specifically with said user.

20. The method of claim 12 wherein the first value of the first location dependent variable comprises a first value for a first location dependent physical property at a location of the access device, and the second value of the second location dependent variable comprises a second value for a second location dependent physical property at a location of the authentication device.

21. The method of claim 12 wherein the first value of the first location dependent variable comprises a first value for a location dependent physical property at a location of the access device, and the second value of the second location dependent variable comprises a second value for the same location dependent physical property at a location of the authentication device.

22. The method of claim 12 wherein the first location dependent variable does not comprise a location dependent physical property, and the second value of the second location dependent variable does comprise a value for a location dependent physical property at a location of the authentication device.

23. The method of claim 22 wherein the first value of the first location dependent variable comprises a value indicating a geographical location of the access device.

24. The method of claim 12 wherein both the first value of the first location dependent variable and the second value for the second location dependent variable do not comprise a value for a location dependent physical property.

25. The method of claim 24 wherein the second value for the second location dependent variable comprises a value indicating a geographical location of the authentication device.

26. The method of claim 24 wherein the first value for the first location dependent variable is a value indicating a geographical location of the access device, and the second value for the second location dependent variable is a value indicating a geographical location of the authentication device.

* * * * *